(12) United States Patent
Spisak

(10) Patent No.: US 7,610,848 B2
(45) Date of Patent: Nov. 3, 2009

(54) DISPENSING MACHINE WITH EDUCTOR

(75) Inventor: Martin John Spisak, Monroe Township, NJ (US)

(73) Assignee: Conpco Inc., Englewood Cliffs, NJ (US)

( * ) Notice: Subject to any disclaimer, the term of this patent is extended or adjusted under 35 U.S.C. 154(b) by 610 days.

(21) Appl. No.: 11/149,111

(22) Filed: Jun. 9, 2005

(65) Prior Publication Data

US 2006/0278090 A1    Dec. 14, 2006

(51) Int. Cl.
*A47J 31/00* (2006.01)

(52) U.S. Cl. .......................... 99/275; 99/323.3; 99/290; 222/129.3

(58) Field of Classification Search ............... 99/275, 99/323.3, 290, 283, 289 R; 222/129.3, 129.1, 222/146.1, 146.2, 129.4; 366/152.2, 160.5, 366/162.1

See application file for complete search history.

(56) References Cited

U.S. PATENT DOCUMENTS

| | | | |
|---|---|---|---|
| 4,042,151 A * | 8/1977 | Uttech | 222/129.2 |
| 4,753,370 A * | 6/1988 | Rudick | 222/105 |
| 6,135,009 A | 10/2000 | Lassota | |
| 6,240,829 B1 * | 6/2001 | McGarrah | 99/275 |
| 6,413,570 B1 | 7/2002 | Lehmberg et al. | |
| 6,599,546 B2 * | 7/2003 | Palaniappan | 426/231 |
| 6,705,358 B1 * | 3/2004 | Tortorici et al. | 141/9 |
| 2004/0050259 A1 | 3/2004 | Tobin et al. | |

FOREIGN PATENT DOCUMENTS

WO        01/65985            9/2001
WO        02/059035 A2        8/2002

OTHER PUBLICATIONS

Co-pending application for: Applicant - Tobin et al., U.S. Appl. No. 10/897,747, filed Jul. 23, 2004.

* cited by examiner

*Primary Examiner*—Reginald L Alexander
(74) *Attorney, Agent, or Firm*—Edward A. Squillante

(57) ABSTRACT

The present invention is directed to a dispensing machine and method for making a beverage. The dispensing machine of this invention has a delivery means which can deliver beverage precursor and beverage enhancing component with a single pump and an eductor. The method results in a beverage, such as a tea-based beverage, that has superior quality, and the dispensing machine is quieter and more energy efficient than standard beverage dispensing machines.

6 Claims, 2 Drawing Sheets

DISPENSING MACHINE WITH EDUCTOR

FIELD OF THE INVENTION

The present invention is directed to a beverage dispensing machine. More particularly, the present invention is directed to a beverage dispensing machine comprising a delivery means suitable to deliver a beverage enhancing component and a beverage precursor with a single pump and an eductor. The delivery means is suitable to deliver beverage enhancing component with the eductor, whereby the beverage enhancing component and the beverage precursor are combined at a point prior to exiting the beverage dispensing machine so that a beverage product with beverage enhancing component can be dispensed. The beverage product dispensed from the beverage dispensing machine of the present invention, has superior flavor and aroma characteristics, and such a beverage is unexpectedly made with a beverage dispensing machine that is lighter, easier to refill, quieter and more energy efficient.

BACKGROUND OF THE INVENTION

Methods for preparing ready-to-dispense beverages, like tea beverages, are known. For example, many food establishments have brewing systems that dispense tea-based beverages ready for consumption. Typically, such systems operate by mixing an instant tea or a brewed tea concentrate with hot water to produce a hot water composition that is combined with cold water to thereby produce a tea beverage that is ready to drink.

Unfortunately, however, when preparing beverages, like tea beverages, from a beverage precursor in the manner described above, the beverages often have, for example, flavor and aroma characteristics that do not meet desired consumer expectations, especially when the beverage precursor employed has aged. This is true because beverage enhancing components, like flavor- and aroma-generating compounds found in beverage precursors, typically degrade within the beverage precursor, a direct result of their unstable nature in the presence of conventional beverage precursor components.

In view of the above, typical ready-to-drink tea dispensing machines, for example, have been modified to post dose flavor and aroma compounds. Such tea dispensing machines can be energy inefficient, difficult to refill and often noisy since they require a first pump to deliver beverage precursor and a second pump to deliver the flavor and aroma compounds.

It is of increasing interest to develop a beverage dispensing machine that comprises a delivery means for efficiently delivering a beverage enhancing component (not formulated within a beverage precursor) to a beverage precursor at a point prior to dispensing a beverage. This invention, therefore, is directed to a beverage dispensing machine comprising a delivery means suitable to deliver a beverage enhancing component, whereby the beverage enhancing component is delivered with an eductor within the delivery means. Such an apparatus unexpectedly produces a beverage of superior flavor and aroma while at the same time being lighter, easier to refill, quieter and more energy efficient than conventional machines. The beverage dispensing machine of this invention delivers beverage precursor and beverage enhancing component with a single pump and eductor.

Additional Information

Efforts have been disclosed for making beverages. In U.S. Pat. No. 6,413,570, a brewed tea concentrate suitable for making a tea beverage is described.

Other efforts have been disclosed for dispensing beverages. In U.S. Pat. No. 6,135,009, a beverage brewing system on a serving cart assembly is described.

Even other efforts have been disclosed for dispensing beverages. In World Application WO 01/65985, a brewing device having automatic and semi-automatic brewing modes is described.

Still other efforts have been disclosed for dispensing beverages. In commonly assigned U.S. application Ser. No. 10/897,747, a beverage dispensing machine that uses negative pressure to deliver beverage product precursors is described.

None of the additional information above describes a beverage dispensing machine comprising a delivery means suitable to deliver (via an eductor) a beverage enhancing component within the beverage dispensing machine whereby the same only requires a single pump for pumping or delivering beverage precursor.

SUMMARY OF THE INVENTION

In a first aspect, the present invention is directed to dispensing machine comprising a means for delivering beverage precursor and beverage enhancing component with a single pump and an eductor, respectively.

In a second aspect, the present invention is directed to a method for making a beverage with the dispensing machine of the first aspect of the invention.

In a third aspect, the present invention is directed to a beverage made with the dispensing machine of the first aspect of this invention.

Beverage precursor, as defined herein, is meant to mean a material that can be contacted with a diluent, like water, to produce a beverage, including a liquid extract or concentrate or powder, like those used to make tea or a beverage from ground bean (such as ground coffee bean) or a soup.

Delivery means is defined as a means for delivering a beverage enhancing component and beverage precursor within a beverage dispensing machine.

Beverage dispensing machine means a system or machine comprising the delivery means of the present.

Beverage enhancing component is defined to mean a component that is naturally found in beverage precursor. Such a beverage enhancing component may be isolated from beverage precursor and is preferably a liquid at ambient temperature. Illustrative beverage enhancing components include, without limitation, flavor-generating compounds, aroma-generating compounds, color-generating compounds and the like. Moreover, typical beverage additives like milk and table sugar for coffee and tea, are not beverage enhancing components as defined herein.

Beverage means a liquid composition that a consumer may drink, either hot or cold. Beverage, therefore, includes soups suitable for drinking, fruit-based beverages, coffee and tea-based beverages and dairy-based beverages, whereby coffee beverages are typically derived from a coffee bean and include ground coffee, and tea-based beverages are derived from *Camillia sinensis* and also include herbal teas. The fruit-based beverage is preferably, lemonade, and the dairy-based beverage is preferably a smoothie.

Viscosity is the flow resistance taken with a Brookfield Programmable, DV-II Viscometer at ambient temperature with Spindle No. LV2 at 30 rpm.

BRIEF DESCRIPTION OF THE FIGURES

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE PREFERRED EMBODIMENTS

Figure 1:
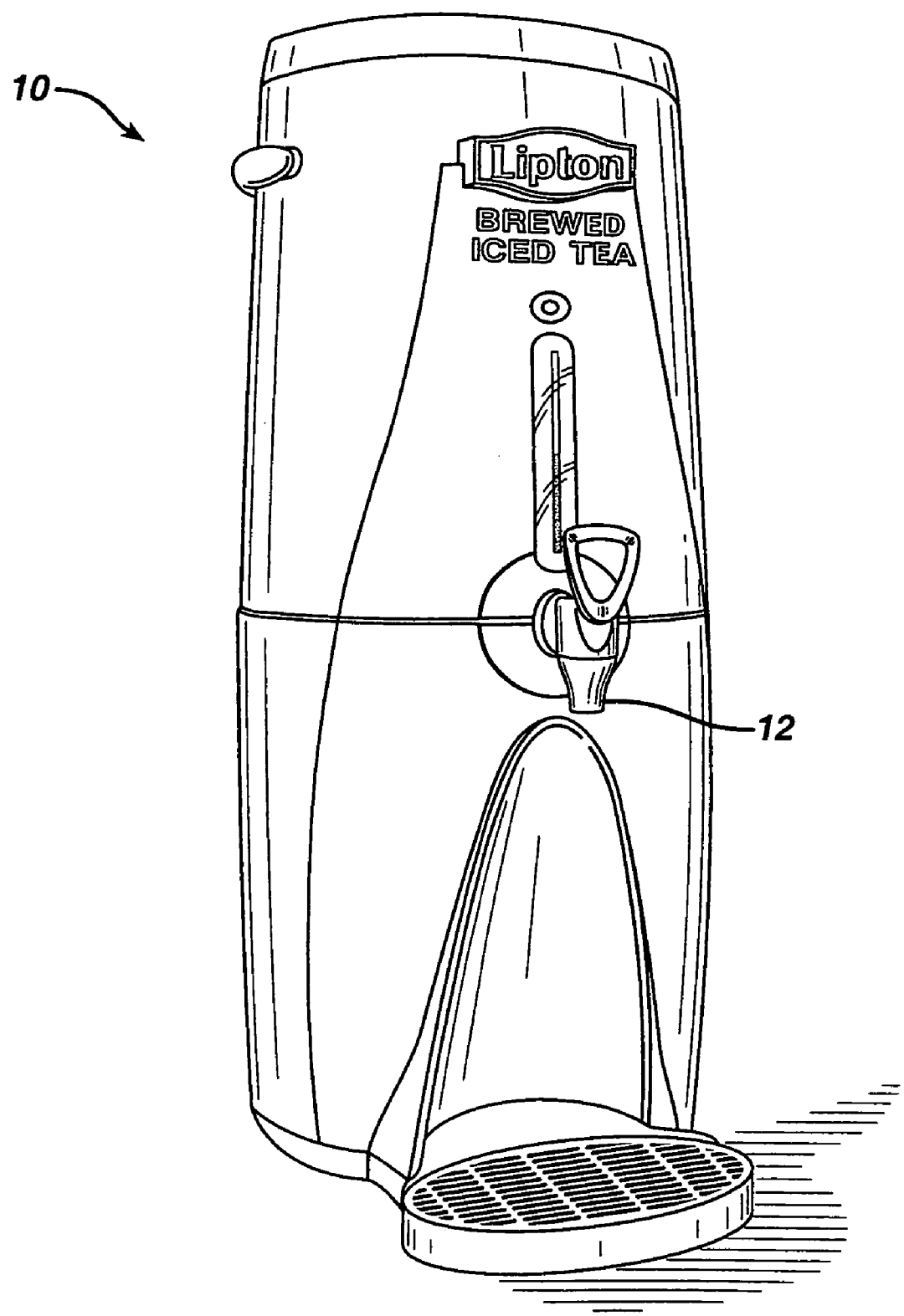
FIG. 1 is a drawing of an illustrative dispensing machine that can comprise the delivery means of the present invention.

There is no limitation with respect to the type of beverage dispensing or brewing machine that may be used with the delivery means of this invention, as long as the machine has the capacity to deliver a beverage precursor and dispense a beverage suitable for human consumption. Illustrative examples of the types of beverage dispensing machines that may be fitted or modified to comprise the delivery means of this invention include those offered from suppliers like Bunn-O-Matic, IMI Cornelius, Inc., Curtis, Black and Decker, and Cecilware. The most preferred beverage dispensing machines that may be used with the delivery means of the present invention are made available by Unilever and sold under the Lipton® Tea Brand.

As to the pump that may be used with the delivery means of this invention, such a pump is limited to those that are employable to deliver beverage precursors for beverages that are consumable by humans (i.e., food grade pumps). The pump suitable for use in this invention is often made commercially available from suppliers like Cole-Palmer (e.g., Master Flex Peristaltic Pump); Seitz, Inc. (e.g., gear comprising pumps); Watson-Marlow Bredel; and Barnant Company.

The conduit (e.g., lines, peristalic tubing) used in this invention is limited only to the extent that it may be used to deliver beverages suitable for consumption by humans. Such conduit may be made of materials comprising copper, galvanized metal, stainless steel, polycarbonate, polyamide, polyester, polyolefin, or the like. In a most preferred embodiment, the conduit used in the present invention is made of Norprene®.

The beverage precursor suitable for use in this invention is often a powder or concentrate used to make soup, coffee, tea, dairy-based or a fruit flavored beverage. In a preferred embodiment, however, the beverage precursor is a concentrate or extract used to make tea-based beverages whereby the concentrate is preferably at least about 45.0% by weight total solids and made available from suppliers like Unilever, under the general category of Lipton® Tea Concentrates or Extracts. Such a beverage precursor typically has a viscosity from about 1 to about 2,000 cps, and preferably, from about 25 to about 500 cps, and most preferably, from about 50 to about 150 cps, including all ranges subsumed therein. A more detailed description of the preferred concentrates that may be used in this invention is set forth in U.S. Pat. No. 6,274,187, the disclosure of which is incorporated herein by reference.

The eductor suitable for use in this invention is one which is food grade and can be used with components used to make a beverage as defined herein. Illustrative examples of the types of eductors that can be used in this invention include those that are commercially available from suppliers like Transvac Systems, Fox Valve Development Corporation, Elmridge, Inc., Schutte and Koertiz and NorthEast Control, Inc. In a preferred embodiment, however, the preferred eductor suitable for use in this invention is a Fox Venturi Eductor.

Turning to the figures, FIG. 1 shows a beverage dispensing machine 10 comprising the delivery means of the present invention (not shown). The beverage dispensing machine 10 may be used, for example, to dispense a tea-based beverage on demand (not shown) from exit pore 12.

Figure 2:
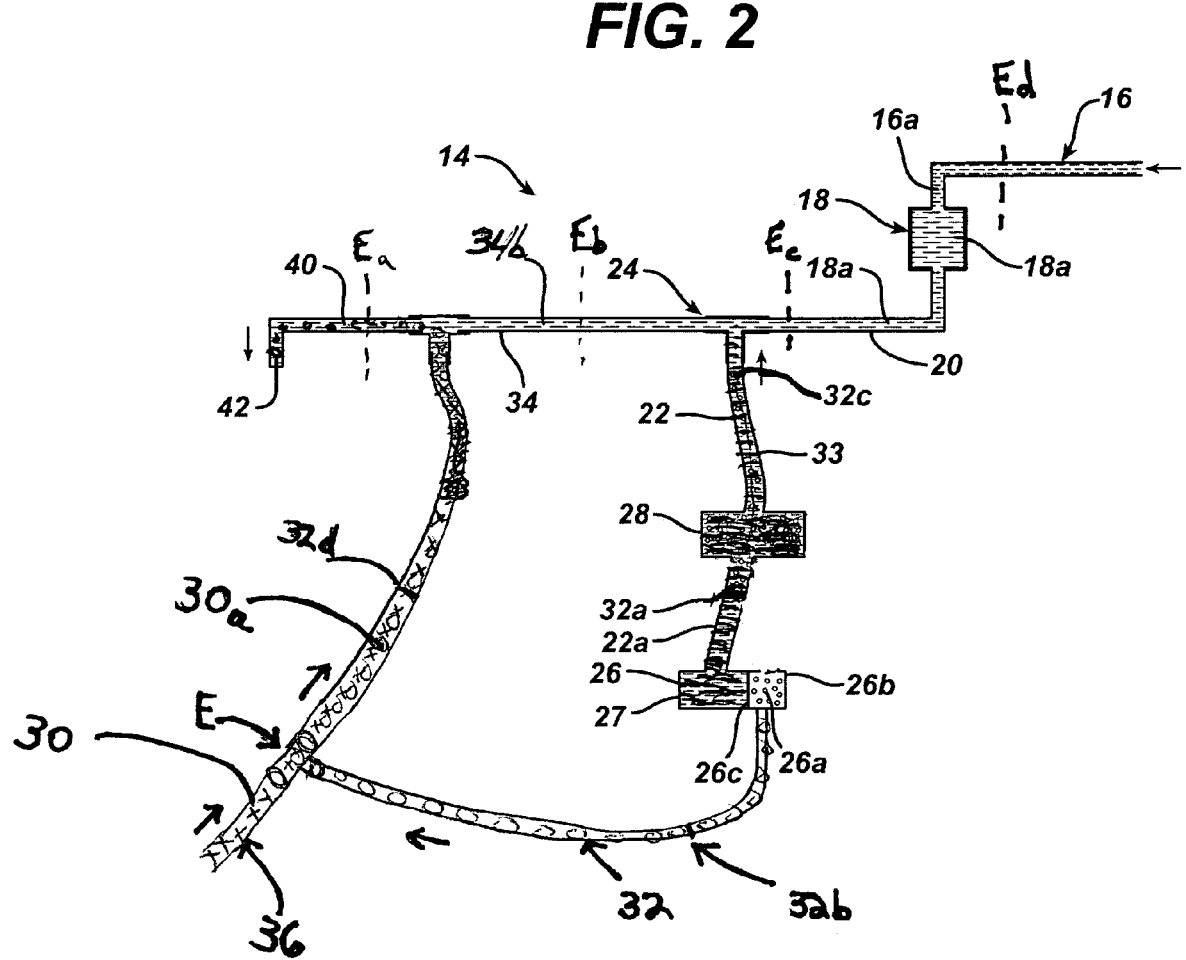
FIG. 2 is an illustrative schematic diagram of a brewing system comprising the delivery means of this invention.

FIG. 2 depicts an illustrative schematic diagram of a brewing system 14 which is preferably within beverage dispensing machine 10 and equipped with an illustrative version of the preferred delivery means of the present invention (with additional options) wherein beverage precursor and flavor enhancing component are combined prior to delivering beverage. Diluent feed conduit 16 supplies diluent (e.g., water, juice, milk or the like) 16a to diluent heater tank 18 to produce heated diluent 18a. Conduit for supplying heated diluent 20 joins, for example, post-pump conduit 22 at mixing conduit 24. Beverage precursor 26, in storage compartment 27, is pumped, via food grade pump 28, to post-pump conduit 22 which stores or holds and supplies beverage precursor to conduit for supplying heated diluent 20.

Beverage enhancing component 26a in storage device 26b (e.g., bottle or polymeric sachet) may be a separate and distinct device (not shown), or preferably, attached to (or operatively associated with) storage compartment 27 wherein separation barrier 26c prevents beverage precursor 26 from mixing with beverage enhancing component 26a during storage and prior to making a beverage. Beverage enhancing component 26a is transported (i.e., fed or drawn) to, for example, non-heated diluent 30 (preferably water supplied from a storage container, or tap or both and not shown) in conduit for transporting non-heated diluent 36 via conduit for transporting beverage enhancing component 32 that is connected to or operatively associated with eductor E in conduit for transporting non-heated diluent 36 thereby producing non-heated diluent mixture 30a. The beverage enhancing component 26 (in non-heated diluent mixture 30a) is delivered to, for example, beverage precursor 26 at heated mixture conduit 34 (i.e., the anterior portion of conduit for carrying heated diluent 20) wherein beverage precursor 26 and heated diluent 18a have already been combined to form heated mixture 34b. The beverage enhancing component 26a usually has a viscosity from about 0.5 to about 10.0, and preferably, from about 0.8 to about 1.2 cps, including all ranges subsumed therein.

Suction created at eductor E by the flow of non-heated diluent 30 within conduit for transporting non-heated diluent 36 draws beverage enhancing component 26a out of storage device 26b (to produce non-heated diluent mixture 30a) and to beverage precursor 26 in heated mixture 34b. Such an arrangement allows for the transport of beverage precursor 26 and beverage enhancing component 26a with preferably only a single food grade pump 28 and preferably only a single eductor E in the brewing system 14.

Optionally, and to prevent backflow, reverse flow prevention valves (like check valves) 32a, 32b, 32c and 32d may be positioned in pre-pump conduit 22a, conduit for transporting beverage enhancing component 32 post-pump conduit 22 and conduit for transporting non-heated diluent 36, respectively.

Subsequent to combining non-heated diluent mixture 30a with heated mixture 34b in and at heated mixture conduit where conduit 34, a superior beverage 40, having, for example, excellent flavor, color and aroma characteristics is produced whereby beverage 40 is ready to be discharged on demand and at opening 42 by way of exit pore 12.

It is within the scope of this invention for the conduit for transporting beverage enhancing component 32 to be directly connected to eductor Ea, Eb, Ec, Ed or a combination thereof and either with or without employing eductor E. Such a brewing system is not shown but may be achieved by using couplings like a Y and/or a T with the desired eductors. The brewing system depicted in FIG. 2, however, is especially preferred.

Regarding the delivery means of this invention, it is often desired for the inside diameter of the pre-pump conduit 22a to be less than about 1.30 cm, and preferably, from about 0.20 cm to about 1.00 cm, and most preferably, from about 0.25 cm to about 0.35 cm, including all ranges subsumed therein. Also, it is often desired for the inside diameter of the conduit for transporting beverage enhancing component 32 to have an inside diameter of less than about 0.35 cm, and preferably, from about 0.075 cm to about 0.30 cm, and most preferably, from about 0.08 cm to about 0.15 cm, including all ranges subsumed therein.

In an especially preferred embodiment, beverage enhancing component 26a flows at a rate from about 10.0 cm/sec to about 20.0 cm/sec, and preferably, at a rate from about 12.5 cm/sec to about 17.5 cm/sec, including all ranges subsumed therein. Beverage precursor 26a, on the otherhand, flows at a rate of about 7.5 cm/sec to about 15.0 cm/sec, and preferably, at a rate from about 8.5 cm/sec to about 13.5 cm/sec, including all ranges subsumed herein. In another especially preferred embodiment, the amount of beverage precursor 26 in the beverage 40 produced with the dispensing machine of this invention is from about 2.0 g/l to about 20 g/l, and preferably, from about 10.0 g/l to about 15 g/l wherein the amount of beverage enhancing component 26a in the beverage produced with the dispensing machine of the present invention is from about 0.25 to about 5.0 g/l, and preferably, from about 1.5 g/l to about 2.5 g/l, including all ranges subsumed therein.

When making a beverage, like a tea-based beverage, with the dispensing machine 10 of the present invention, the beverage typically comprises at least about 80.0%, and preferably, at least about 85.0%, and most preferably, at least about 90.0% by weight total diluent (i.e., total diluent being the total amount of heated and non-heated diluent), the balance of the total weight of the beverage comprising no less than about 0.1% by weight beverage enhancing component, and preferably, no less than about 1.0% by weight beverage precursor. The total amount of diluent used can comprise about 90.0% heated diluent, but preferably comprises less than about 45.0%, and most preferably, less than about 30.0% by weight heated diluent, but at least about 0.2% by weight heated diluent. Moreover, the beverage 40 brewed via the beverage dispensing machine 10 of the present invention typically exits the beverage dispensing machine 10 from the exit pore 12 at a flow rate from about 1.0 to about 5.0, and preferably, from about 1.5 to about 4.0, and most preferably, from about 2.0 to about 3.0 fluid ounces/second, including all ranges subsumed therein.

It is particularly noted that refilling the beverage dispensing machine 10 with beverage precursor 26 and beverage enhancing component 26a has been made easier since only the pre-pump conduit 22a and conduit for transporting beverage enhancing component 32 need to be connected to storage compartment 27 and storage device 26b, respectively, in order for the beverage dispensing machine 10 to operate. Also, since the beverage dispensing machine 10 of this invention does not employ a pump to deliver beverage enhancing component and a pump to deliver beverage precursor, it is lighter, easier to refill, and quieter.

The following example is provided to facilitate an understanding of the present invention. The example is not intended to limit the scope of the invention as set forth in the claims.

EXAMPLE

A dispensing machine having the capacity to dispense beverage precursor and beverage enhancing component with a single pump and eductor (as described in FIG. 2) can be made. Peristaltic tubing can be used with a conventional coupling to connect the conduit for transporting beverage enhancing component 32 to eductor E placed in series with non-heated diluent conduit 36 in order to mix the same carrying (beverage enhancing component) with beverage precursor (tea concentrate with about 50% tea solids). The conduit for transporting beverage enhancing component can be attached to a storage compartment having beverage enhancing component (flavor and aroma compounds isolated from a tea concentrate). Tea, ready for drinking, may be dispensed from the tea brewing machine and given to panelists. It is expected that all of the panelists will conclude that the tea dispensed from the machine of this invention will have excellent flavor and aroma characteristics. Moreover, it is expected that all of the panelists will conclude that the dispensing machine of the present invention is quieter and easier to re-fill when compared to conventional dispensing machines having a pump to provide beverage precursor and an eductor to provide beverage enhancing component.

What is claimed is:

1. A dispensing machine comprising:
   (a) a conduit for transporting beverage enhancing component attached to a storage device comprising beverage enhancing component, wherein the beverage enhancing component is selected from the group consisting of flavor-, aroma-, color-generating component, and mixtures thereof; and
   (b) a single pre-pump conduit attached to a storage compartment comprising beverage precursor
   wherein the beverage precursor is pumped within the dispensing machine with a food grade pump and is mixed with a heated diluent, and the beverage enhancing component is transported to the beverage precursor through an eductor placed within a non-heated diluent conduit and further wherein the non-heated mixture of the beverage enhancing component and non-heated diluent mixes with the heated mixture of beverage precursor and a heated diluent within the diluent mixture conduit comprising the beverage enhancing component and eductor, or another diluent conduit free of an eductor, and the dispensing machine has an exit head that does not comprise an eductor.

2. The dispensing machine according to claim 1 wherein the beverage enhancing component enhances the flavor and aroma of tea.

3. The dispensing machine according to claim 1 wherein the beverage precursor is a concentrate for making tea.

4. The dispensing machine according to claim 1 wherein the conduit for transporting beverage enhancing component is connected to an eductor within a diluent conduit that carries non-heated diluent.

5. The dispensing machine according to claim 3 wherein the dispensing machine dispenses ready-to-drink tea, coffee, a dairy-based beverage or lemonade.

6. The dispensing machine according to claim 1 wherein the dispensing machine dispenses lemonade or ready-to-drink tea.

* * * * *